(12) United States Patent
Olsen et al.

(10) Patent No.: US 7,248,490 B2
(45) Date of Patent: Jul. 24, 2007

(54) BATTERY AND INVERTER CONFIGURATION WITH INCREASED EFFICIENCY

(75) Inventors: Ib Ingemann Olsen, New York, NY (US); Nicholas Blaise Pasquale, Somers, NY (US)

(73) Assignee: Gaia Power Technologies, Inc., New York, NY (US)

( * ) Notice: Subject to any disclaimer, the term of this patent is extended or adjusted under 35 U.S.C. 154(b) by 73 days.

(21) Appl. No.: 10/710,085

(22) Filed: Jun. 17, 2004

(65) Prior Publication Data

US 2005/0281064 A1    Dec. 22, 2005

(51) Int. Cl.
*H02M 7/00* (2006.01)
*H02J 1/00* (2006.01)
*H02M 7/537* (2006.01)

(52) U.S. Cl. .......................................... 363/71; 307/82
(58) Field of Classification Search ................ 363/65, 363/71, 72; 307/58, 80, 82, 65, 86
See application file for complete search history.

(56) References Cited

U.S. PATENT DOCUMENTS

| | | | |
|---|---|---|---|
| 5,031,088 A * | 7/1991 | Tanaka | 363/71 |
| 6,175,512 B1 * | 1/2001 | Hagihara et al. | 363/71 |
| 6,311,137 B1 * | 10/2001 | Kurokami et al. | 702/60 |
| 6,838,611 B2 * | 1/2005 | Kondo et al. | 136/244 |
| 7,026,783 B2 * | 4/2006 | Eckardt | 318/800 |

OTHER PUBLICATIONS

"Outback Power Systems - FX and VFS Inverter/Charger Systems - Installation and Programming Manual", dated May 3, 2004, 52 pages.
"Outback Power Systems," http://www.outbackpower.com, as of May 26, 2004 according to Internet Archive Wayback Machine, available at http://web.archive.org/web/20040526145412/http://www.outbackpower.com/, 2 pages.
"Outback Power Systems Products," www.outbackpower.com/productslinks.htm, as of May 26, 2004 according to Internet Archive Wayback Machine, available at http://web.archive.org/web/20040606051806/www.outbackpower.com/productslinks.htm, 1 page.

* cited by examiner

*Primary Examiner*—Matthew V. Nguyen
(74) *Attorney, Agent, or Firm*—Fish & Richardson P.C.

(57) ABSTRACT

In the current invention, in order to increase efficiency of battery powered AC electricity supply, multiple inverter/battery modules are used in parallel but can be individually shut down. The number of inverters activated depends on the power usage. When only a little power is needed only one or a few inverters are activated. When more power is needed the battery inefficiency increases and more inverters will be activated.

17 Claims, 8 Drawing Sheets

BATTERY AND INVERTER CONFIGURATION WITH INCREASED EFFICIENCY

BACKGROUND OF INVENTION

The invention relates to battery and inverter configuration and more specifically battery and inverter configuration with increased efficiency.

DESCRIPTION OF PRIOR ART

In prior systems, the inverters are always activated so at low load the system is not very efficient. Even though multiple inverters are used only one battery string may be used and as more power is used the batteries operate more inefficiently. Where only one inverter is used the system lacks redundancy and if the inverter or battery string fails the whole system fails. Some inverters may have a low stand-by power usage, but as soon as they are activated, their power consumption goes up. The efficiency of inverters at low power usage is still low.

There is still room for improvement in the art.

SUMMARY OF INVENTION

In order to increase efficiency of battery powered AC electricity supply, the current invention has multiple inverter/battery modules that are used in parallel but that can be individually shut down. The number of inverters activated depends on the power usage. When only a little power is needed only one or a few inverters are activated. When more power is needed the battery inefficiency increases and more inverters will be activated.

BRIEF DESCRIPTION OF DRAWINGS

Without restricting the full scope of this invention, the preferred form of this invention is illustrated in the following drawings.

DETAILED DESCRIPTION

The following description is demonstrative in nature and is not intended to limit the scope of the invention or its application of uses.

There are a number of significant design features and improvements incorporated within the invention.

To increase efficiency of battery powered AC electricity supply, the current invention has multiple inverter/battery modules that are used in parallel but that can be individually shut down. The number of inverters activated depends on the power usage. When only a little power is needed only one or a few inverters are activated. When more power is needed the battery inefficiency increases and more inverters will be activated.

Figure 1:
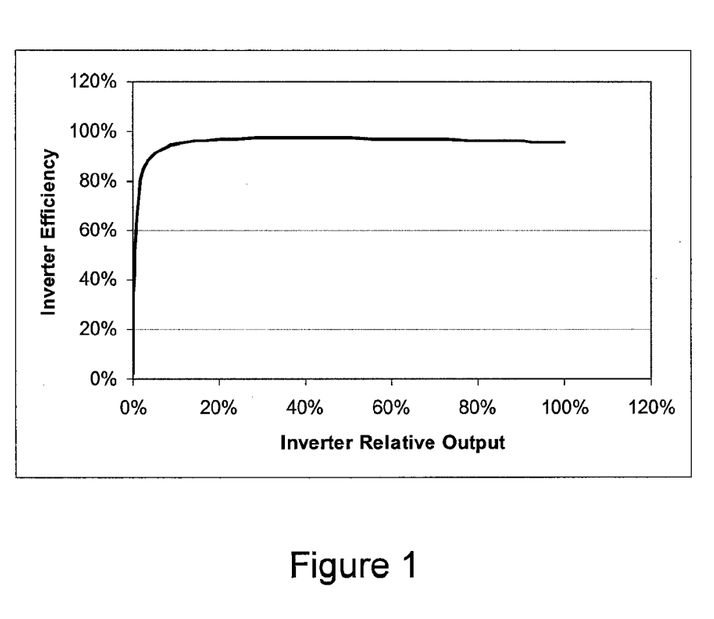
FIG. 1 is a chart showing Inverter efficiency based on relative power usage.
Figure 2:
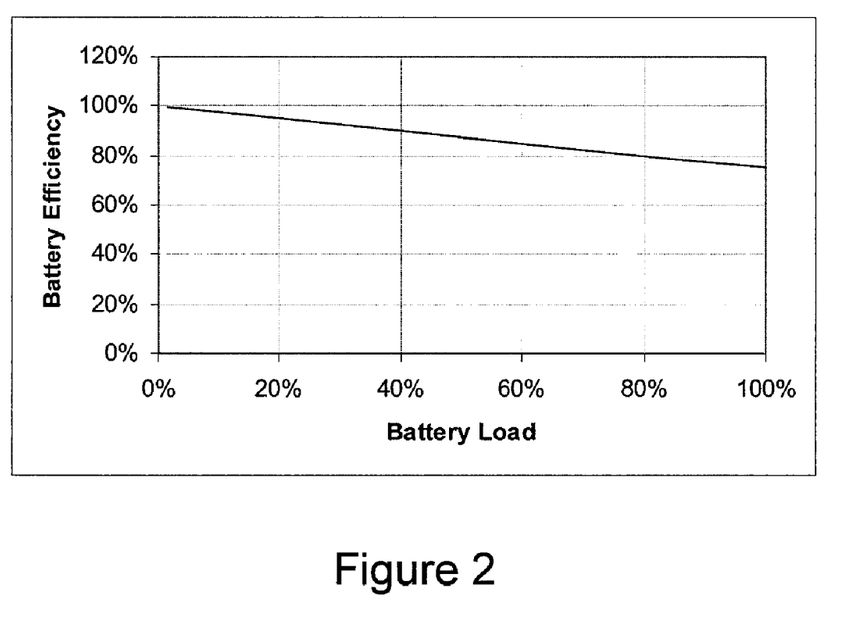
FIG. 2 is a chart showing Battery power efficiency versus power usage.

FIG. 1 displays a chart showing Inverter efficiency versus relative power usage. The chart shows that inverter efficiency goes up exponentially based on inverter relative output. While FIG. 2 displays a chart that shows Battery power efficiency versus power usage. This chart shows how battery efficiency goes down based on battery load.

Figure 3:
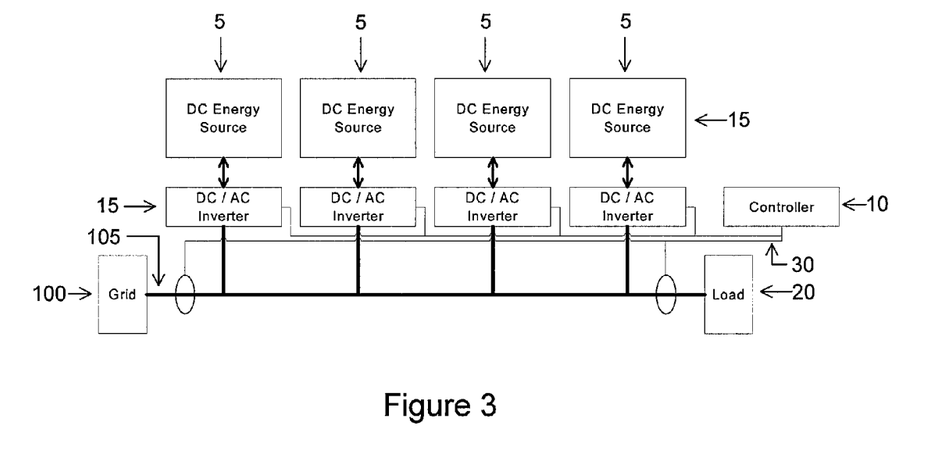
FIG. 3 displays the Inverter/battery modules in parallel and connected to a controller.

The invention consists of inverters supplied with power from a string of batteries (DC energy sources) 5 where two or more of the inverters are connected to a common load 20 and where two or more of the inverters are also connected to a controller 10 through a communication bus 30 connected to inverters 15. The DC energy sources 5 are connected to the inverters 15 which are connected to the power grid 100 and load 20 through the line 105. The controller 10 can be a separate unit or the inverters 15 can have individual controls that form a peer-to-peer network and the control is divided between the units. This provides extra redundancy so that in case one unit is lost the rest can provide the control function. FIG. 3 displays the Inverter/battery modules in parallel and connected to a controller 10.

Figure 4:
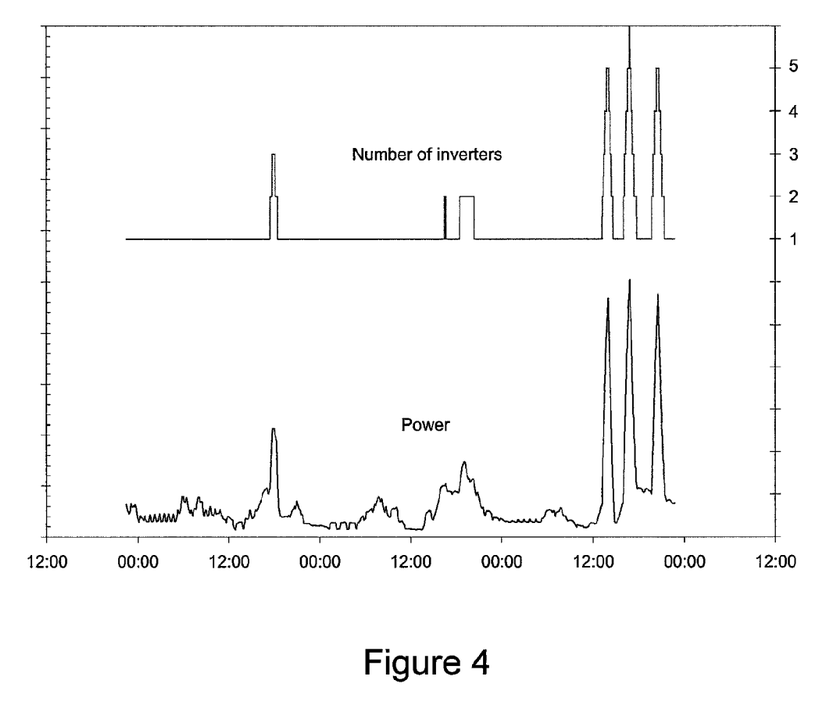
FIG. 4 is a graph displaying an example of the number of inverters activated based on actual power usage.

FIG. 4 shows a graph displaying an example of the number of inverters 15 activated based on actual power usage. It shows that more inverters 15 are needed for higher power loads.

Figure 5:
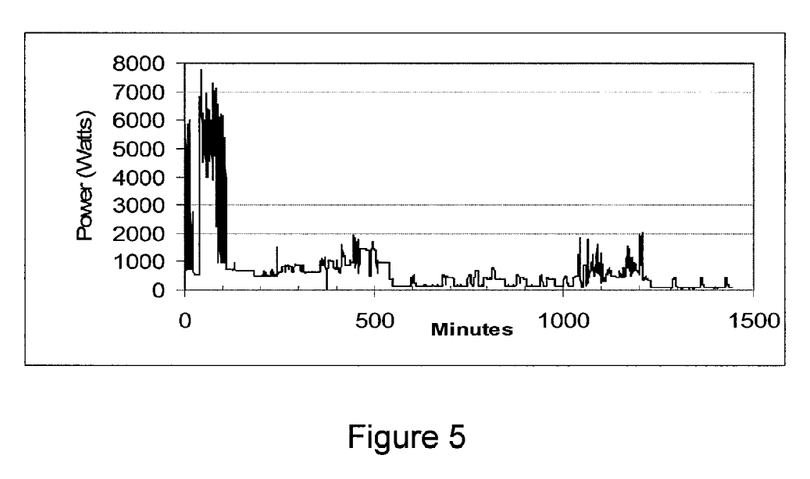
FIG. 5 is a graph of residential power usage.
Figure 6:
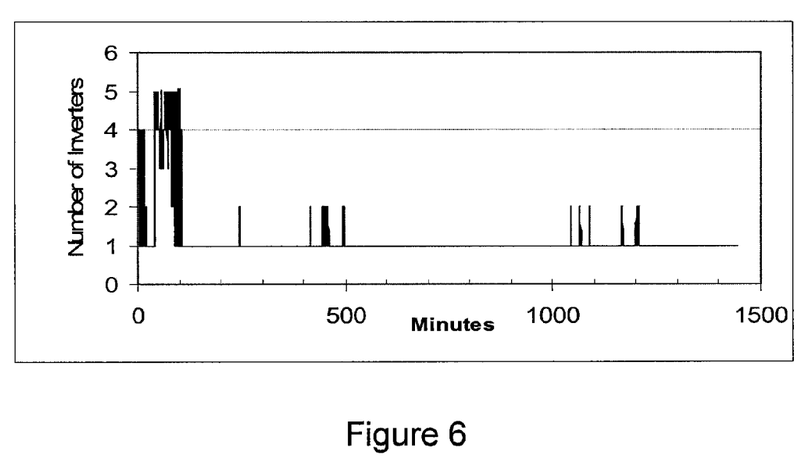
FIG. 6 is a graph of the number of inverters needed to service consumption assuming 2 kW inverters and 1.5 kW thresholds.

The controller 10 measures the power consumption of the load using a sensor. Based on the power consumption and a built-in algorithm and/or look-up table the controller determines which of the inverters to activate. Said built-in algorithm and/or look-up table is stored on said controller 10 in a memory means which are well know in the art. FIG. 5 displays a graph of residential power usage. While FIG. 6 displays a graph of the number of inverters 15 needed to service power consumption in FIG. 5 assuming 2 kW inverters and 1.5 kW thresholds.

In this invention, the inverters 15 do not need to be of the same power rating. A lower power inverter 15 could be used to run the loads during extended low power periods. In case the inverters are used for peak shaving, batteries connected to inverters 15 not in use can be recharged as long as the input power does not exceed the peak shaving threshold. A simple algorithm for equal sized inverters could be: $n_{inverters} = INT(P_{usage}/P_{threshold})$ where the number of inverters needed is the integer part of power usage divided by a threshold power depending on the inverters used.

Figure 7:
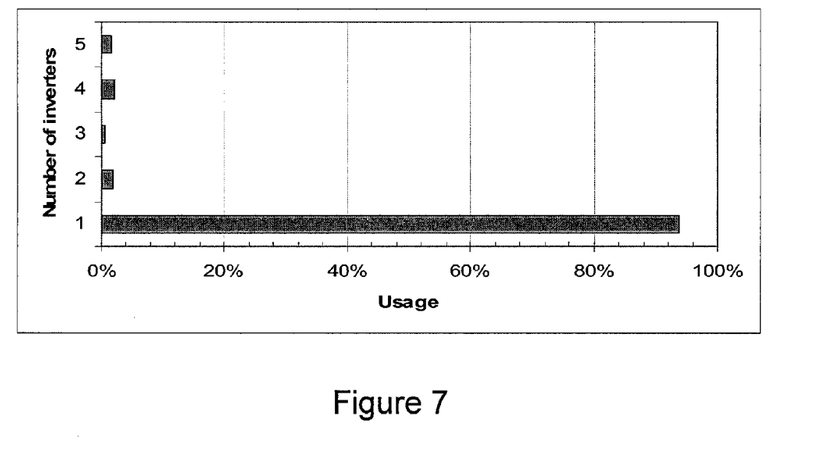
FIG. 7 is a graph illustrating an example where only one inverter is needed for more than 95% of the time.

As shown in the bar chart in FIG. 7, only one inverter is needed in more than 95% of the time based on normal power usage.

The electrochemical storage 5 feeding DC current to the individual inverter 15 can be identical for all inverters 15. Using the same type of storage (batteries and/or capacitors and/or flywheels) 5 will create redundancy. This is so in case one string fails the others can provide energy but at a reduced level. Using different types of storage may allow for the use of high power/short duration energy storage for peak power and high energy storage devices for base power. In the preferred embodiment, suitable high power storage devices 5 may include but are not limited to: High power lead-acid, high power nickel metal hydride, nickel zinc, lithium-ion, lithium-metal, sodium chloride batteries, and symmetrical or asymmetrical supercapacitors (also called ultra capacitors), and mechanical flywheel technology. The suitable high energy storage devices 5 also may include but are not limited to: Lead-acid, nickel metal hydride, sodium sulfur, nickel chloride, nickel zinc, lithium-ion, and lithium metal batteries.

Figure 8:
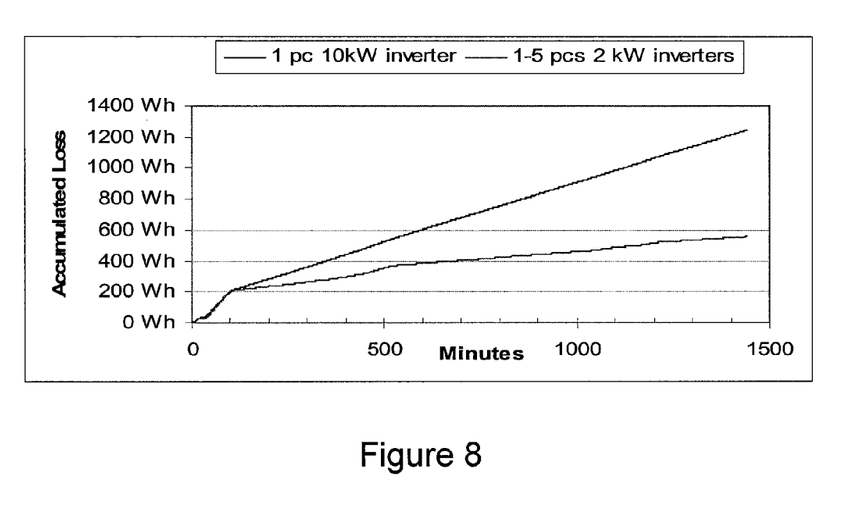
FIG. 8 is a graph based on an example of using five 2 kW inverters instead of one 10 kW inverter.

FIG. 8 displays a graph based on an example of using five 2 kW inverters 15 instead of one 10 kW inverter. It shows that using 52 kW inverters instead of one 10 kW inverter 15 can potentially reduce the power loss by 50% or more.

Alternative Embodiments In yet another embodiment of the invention, the base power may also be supplied using power generating devices including but not limited to fuel-cells, solar-panels, gas turbines, sterling engines, and diesel generators.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An AC electricity supply system comprising:
   a plurality of DC power sources;
   a plurality of inverters, wherein each inverter is connected to a corresponding DC power source and is configured to convert DC electricity from the corresponding DC power source into AC electricity;
   a power line connecting each of the plurality of inverters to an AC load for providing AC electricity from the plurality of inverters to the AC load; and
   a controller operatively coupled to each of the plurality of inverters by a communications bus, wherein the controller is configured to measure a power consumption of the AC load and, based on the measured power consumption of the AC load, activate an appropriate number of inverters.

2. The AC electricity supply system of claim 1 wherein the plurality of DC power sources comprise a plurality of batteries.

3. The AC electricity supply system of claim 1 wherein each of the plurality of inverters has its own controller.

4. The AC electricity supply system of claim 1 wherein at least two of the plurality of inverters have different power ratings.

5. The AC electricity supply system of claim 1 wherein said controller is connected to a sensor that is configured to measure the power consumption.

6. The AC electricity supply system of claim 1 wherein the plurality of inverters are connected to the AC load in parallel.

7. The AC electricity supply system of claim 1 wherein each of the plurality of DC power sources is configured to be recharged when not in use.

8. The AC electricity supply system of claim 1 wherein at least one of the plurality of DC power sources is a capacitor.

9. The AC electricity supply system of claim 1 wherein the plurality of DC power sources are identical.

10. A method for providing AC electricity to an AC load, the method comprising:
    measuring a power consumption of the AC load, wherein power is provided to the AC load from a plurality of inverters, each of the plurality of inverters being connected to a corresponding DC power source; and configured to convert DC electricity from the corresponding DC power source into AC electricity;
    based on the measured power consumption, determining an appropriate number of inverters to activate; and
    activating the appropriate number of inverters.

11. The method of claim 10 wherein the corresponding DC power source comprises a battery.

12. The method of claim 10 wherein at least two of the plurality of inverters have different power ratings.

13. The method of claim 10 wherein the plurality of inverters are connected to the AC load in parallel.

14. The method of claim 10 wherein the corresponding DC power source is configured to be recharged when not in use.

15. The method of claim 10 wherein the corresponding DC power source is a capacitor.

16. The AC electricity supply system of claim 1 wherein the controller is further configured to determine the appropriate number of inverters to activate in accordance with an equation or look-up table stored on the controller and based on a measured power consumption of the AC load.

17. The method of claim 10 wherein determining an appropriate number of inverters to activate is performed in accordance with an equation or look-up table.

* * * * *